United States Patent Office 3,444,236
Patented May 13, 1969

3,444,236
PREPARATION OF CYANOPHENOLS BY DE-HYDRATION OF HYDROXYBENZALDOXIMES WITH PHOSGENE
Yoshihiko Nishizawa, Nara-shi, Masataka Nakagawa, Yamatotakada-shi, and Akio Kimura, Takarazuka-shi, Japan, assignors to Sumitomo Chemical Company, Ltd., Higashi-ku, Osaka, Japan, a corporation of Japan
No Drawing. Filed July 11, 1966, Ser. No. 564,012
Claims priority, application Japan, July 29, 1965, 40/46,033; Oct. 2, 1965, 40/60,435
Int. Cl. C07c *121/50, 47/52*
U.S. Cl. 260—465                                           6 Claims

ABSTRACT OF THE DISCLOSURE

A method for producing cyanophenols, such as p-cyanophenol, which may be used as intermediates in preparing agricultural chemicals by dehydrating a corresponding hydroxybenzaldoxime with phosgene in a reaction medium such as water, and benzene. The hydroxybenzaldoxime may be used without isolation from an oxime formation reaction mixture obtained by reacting a hydroxybenzaldehyde with a hydroxylamine aqueous solution.

---

This invention relates to a novel method for producing cyanophenols represented by the general formula

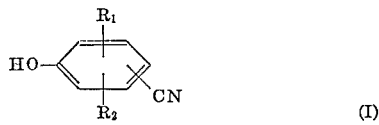
(I)

wherein $R_1$ is hydrogen, chlorine, bromine, iodine, a lower alkyl or an alkoxy having 1 to 4 carbon atoms, and $R_2$ is hydrogen, chlorine, bromine or iodine, which comprises reacting a hydroxybenzaldoxime represented by the general formula

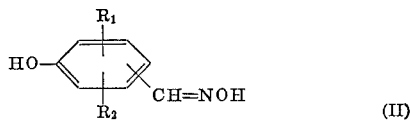
(II)

wherein $R_1$ and $R_2$ are as defined above, with phosgene.

It is well known, in general, to synthesize cyano groups by dehydrating aldoximes with various dehydrating agents, and typical reaction examples are as follows:

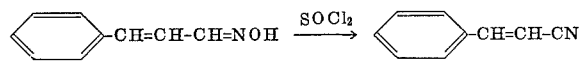

(Annalen der Chemie, vol. 389, page 117 (1912).)

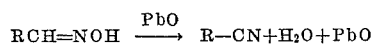

(Berichte, vol. 39, page 2503 (1906).)

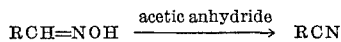

(Journal of American Chemical Society, vol. 66, page 1553 (1944).)

However, in case free phenolic hydroxyl groups are present in the molecules, the above reactions become markedly complex. For example, in case PbO is used as the dehydrating agent, the decomposition of phenols takes place, while when acetic anhydride is used, there occurs the acetylation of hydroxyl groups simultaneously with dehydration reaction, so that hydrolysis should newly be effected after dehydration to convert them into free phenols. In addition, during said hydrolysis, the hydrolysis of cyano groups also take place as a side reaction to form acid amides, with the result that not only the yields of cyanophenols are lowered but also the separation and purification of products become difficult to make the procedures greatly complex when carried out on commercial scale. Although thionyl chloride dehydrates only aldoximes without affecting free phenols, the compound itself is expensive, and the use thereof for industrial purpose is extremely disadvantageous from the economical standpoint.

As the result of various studies on economically advantageous processes in which only aldoximes are dehydrated in high yields without affecting phenolic hydroxyl groups, the present inventors have found that the reaction in accordance with the method of the present invention is the most excellent.

In order to synthesize cyanophenols according to the method of the present invention, the aldoximes (II) are dissolved or suspended in inert reaction medium and phosgene in a calculated amount or in slight excess of the calculated amount may be blown into the solutions or dispersions. In this instance, the reaction sometimes terminates quickly by heating, depending on the kind of aldoximes (II).

In Formula II, examples of the alkyl group in $R_1$ are methyl, ethyl, n-propyl, isopropyl, n-butyl and tert.-butyl groups, and examples of the alkoxy group in $R_1$ are methoxy, ethoxy, n-propoxy, isopropoxy and n-butoxy groups.

As the inert reaction medium, there are used water, benzene, toluene, ethylether, isopropylether, monochlorobenzene and mixture thereof. The amount of inert solvent is 5–10 times the amount (by weight) of aldoxime.

The temperature at which phosgene is blown is from room temperature to the boiling point of the reaction medium employed. The period of time for blowing phosgene is until the generation of hydrochloric acid and carbon dioxide gas has ceased.

After the generation of hydrochloric acid gas from the reaction system has ceased, air or a nitrogen or carbon dioxide gas is blown to remove unreacted phosgene and hydrochloric acid from the reaction system, or the reaction system is washed with water, and the organic solvent layer is dried and then the organic solvent is removed, whereby a substantially pure cyanophenol (I) can be obtained. The thus obtained cyanophenol (I) is so pure as to be sufficiently usable as such in the subsequent step. If necessary, however, it may be recrystallized according to procedures known to the literature. As a solvent for recrystallization, there is used, for example,, water, benzene, toluene, ethanol or a mixture thereof.

The hydroxybenzaldoximes employed in the present invention can be prepared in high yields according to various processes known to the literature. Typical compounds thereof are as follows:

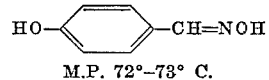

M.P. 72°–73° C.
Berichte, vol. 16, p. 1785 (1883)

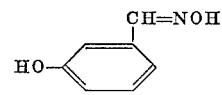

M.P. 87.5° C.
Berichte, vol. 24, p. 826 (1891)

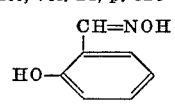

M.P. 57° C.
Berichte, vol. 16, p. 1785 (1883)

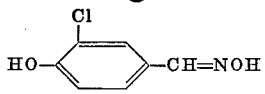
M.P. 144° C.
Berichte, vol. 37, p. 4034 (1904)

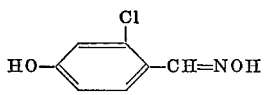
M.P. 194° C.
Annalen, vol. 35, p. 334 (1907)

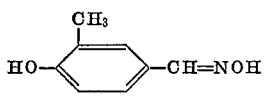
M.P. 143.5° C.
Berichte, vol. 24, p. 3672 (1891)

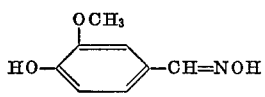
M.P. 120°–121° C.
U.S. Patent 2,644,830; (1953)

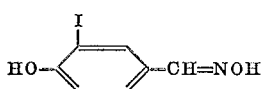
M.P. 203° C.
Berichte, vol. 24, p. 2304 (1896)

In practicing the present invention on commercial scale, isolated oximes may be used, depending on objects, and may be reacted with phosgene. Generally, however, oximes are crystals, and therefore the operation for isolation thereof is not advantageous from the industrial standpoint. It is economically advantageous that oxime is not isolated from the oxime formation step and phosgene is introduced into the reaction liquid, whereby the desired cyanophenol can be easily obtained.

The synthesis of cyanophenols according to this method is carried out by reacting according to the procedure known to the literature hydroxybenzaldehydes with hydroxylamines in water or alcoholic aqueous solutions to form oximes and blowing, without taking the oximes out, phosgene into the reaction liquids at or above room temperature. After completion of the reaction, the desired cyanophenols deposit as crystals from the reaction liquids at or below room temperature. Further, after completion of the reaction, excess phosgene may be removed out of the reaction system by blowing air, nitrogen gas or carbon dioxide gas.

Typical examples of the hydroxybenzaldehydes employed in this method are as follows:

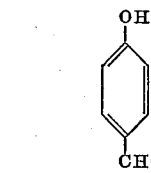
M.P. 115°–116° C.
Berichte, vol. 9, p. 824 (1876)

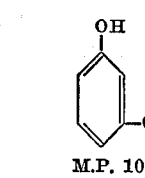
M.P. 104° C.
Berichte, vol. 15, p. 2044 (1882)

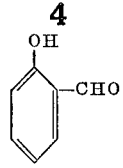
M.P. 196.7° C.
Berichte, vol. 41, p. 4148 (1908)

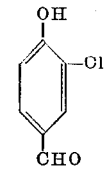
M.P. 139° C.
German Patent 105,798

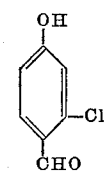
M.P. 146.5° C.
Annalen, vol. 357, p. 334 (1907)

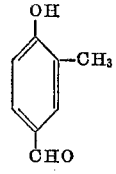
M.P. 115° C.
Berichte, vol. 31, p. 1766 (1898)

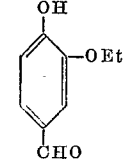
M.P. 77.5° C.
D.R.P. 81071

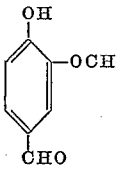
M.P. 80°–81° C.
Berichte, vol. 14, p. 2023 (1881)

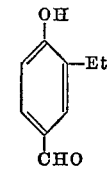
M.P. 172°–173° C.
Annalen, vol. 357, p. 323

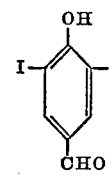
M.P. 198° C.
Berichte, vol. 28, p. 2412 (1895)

The cyanophenols provided by the present invention are intermediates useful for the preparation of active compounds as agricultural chemicals, particularly insecticides and herbicides.

The following examples only illustrate the method of the present invention further in detail, and it is not intended to limit the invention to these examples.

EXAMPLE 1

12.1 g. (0.1 mole) of parahydroxybenzaldoxime was suspended in 100 ml. of toluene. To the suspension, a solution of 12 g. (0.12 mole) of phosgene in 30 ml. of toluene was added dropwise while maintaining the temperature at 80°–85° C., whereby hydrochloric acid was vigorously generated from the reaction system. After the dropwise addition, the heating was continued at said temperature for 30 minutes with stirring, and then the reaction system was cooled to room temperature. The toluene layer was thoroughly washed with water and was dried with anhydrous sodium sulfate. Thereafter, toluene was removed under reduced pressure to obtain 11.3 g. (yield 95%) of paracyanophenol having a melting point of 113° C. This product showed no melting point depression even when mixed and melted with a standard product prepared according to Sandmeyer's process.

EXAMPLE 2

17.2 g. (0.1 mole) of 3-chloro-4-hydroxybenzaldoxime was dissolved in 100 ml. of isopropyl ether. Into the solution, phosgene in two times the calculated amount was blown at room temperature. After stirring for one hour at room temperature, the solution was subjected to entirely the same treatments as in Example 1 to obtain 12 g. (yield 80.0%) of 2-chloro-4-cyanophenol having a melting point of 155° C. This product showed no melting point depression even when mixed and melted with a synthesized standard product.

EXAMPLE 3

15.1 g. (0.1 mole) of 3-methyl-4-hydroxybenzaldoxime was suspended in 100 ml. of benzene. The suspension was subjected with heating and stirring to entirely the same treatments as in Example 1 to obtain 12 g. (yield 90%) of 2-methyl-4-cyanophenol having a melting point of 93° C. This product showed no melting point depression even when mixed and melted with a synthesized standard product.

EXAMPLE 4

16.7 g. (0.1 mole) of 3-methoxy-4-hydroxybenzaldoxime was dissolved in 100 ml. of chlorobenzene. The resulting solution was subjected with heating and stirring to entirely the same treatments as in Example 1 to obtain 11.9 g. (yield 80%) of 2-methoxy 4-cyanophenol having a melting point of 87° C. The product showed no melting point depression even when mixed and melted with a synthesized standard product.

EXAMPLE 5

38.9 g. (0.1 mole) of 3,5-diiodo-4-hydroxybenzaldoxime was dissolved in 100 ml. of chlorobenzene. To the solution was dropwise added at 70°–90° C. a solution of 12 g. (0.12 mole) of phosgene in 30 ml. of chlorobenzene. Thereafter, the mixed solution was treated in the same manner as in Example 1 to obtain 35.2 g. (yield 95%) of 2,6-diiodo-4-cyanophenol having a melting point of 212°–214° C. This product showed no melting point depression even when mixed and melted with a synthesized standard product.

EXAMPLE 6

24 g. of p-hydroxybenzaldehyde was mixed with 72 g. of a 10% hydroxylamine acidic aqueous solution by sulfuric acid and the mixture was heated to 40° C. to a homogeneous solution. To the solution, an aqueous sodium hydroxide solution was added to make the pH 5.0, and the mixed solution was then heated to 85°–90° C. Into the solution, 34 g. of phosgene was introduced, and the reaction liquid was heated and stirred for a while and was then cooled, whereby p-cyanophenol deposited as white crystals. The crystals were collected by filtration, were washed with cold water and were then dried to obtain 22.0 g. (yield 94%) of crystals of p-cyanophenol having a melting point of 112° C. This product showed no temperature depression even when mixed and melted with a standard product prepared according to Sandmeyer's process.

What we claim is:

1. A method for producing cyanophenols represented by the formula

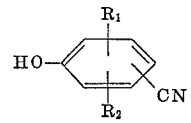

wherein $R_1$ is hydrogen, chlorine, bromine, iodine, a lower alkyl of 1 to 4 carbon atoms or lower alkoxy of 1 to 4 carbon atoms and $R_2$ is hydrogen, chlorine, bromine or iodine, which comprises contacting a hydroxybenzaldoxime represented by the formula

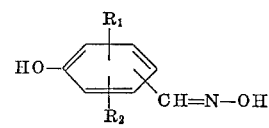

wherein $R_1$ and $R_2$ are as defined above, with gaseous phosgene in an amount of 1–2 mole phosgene per mole of the hydroxybenzaldoxime in an inert reaction medium selected from the group consisting of water, benzene, toluene, ethyl ether, isopropyl ether, monochlorobenzene or mixtures thereof at a temperature of from room temperature to the boiling point of the reaction medium, and recovering the cyanophenol product from the reaction mixture.

2. A method according to claim 1, wherein the hydroxybenzaldoxime is used without isolation from an oxime formation reaction mixture obtained by reacting a hydroxybenzaldehyde represented by the formula

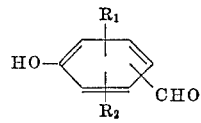

wherein $R_1$ and $R_2$ are defined in claim 1, with hydroxyl amine aqueous solution.

3. A method according to claim 1, wherein the cyanophenols are paracyanophenol, 2-chloro-4-cyanophenol, 2-methyl-4-cyanophenol, 2-methoxy-4-cyanophenol and 2,6-diiodo-4-cyanophenol.

4. A method according to claim 1 wherein the hydroxybenzaldoxime is selected from the group consisting of orthohydroxybenzaldoxime, metahydroxybenzaldoxime, parahydroxybenzaldoxime, 2-chloro - 4 - hydroxybenzaldoxime, 3-chloro-4-hydroxybenzaldoxime, 3 - methyl-4-hydroxybenzaldoxime, 3 - methoxy-4-hydroxybenzaldoxime, and 3,5-diiodo-4-hydroxybenzaldoxime.

5. A method according to claim 1 wherein $R_1$ and $R_2$ are each hydrogen.

6. A method according to claim 1 wherein $R_1$ is chlorine and $R_2$ is hydrogen.

(References on following page)

References Cited

UNITED STATES PATENTS 3,129,260   4/1964   Yates et al. _____ 260—465 X
2,650,933   9/1953   Pearl _____ 260—465 X

OTHER REFERENCES

Mowry: Chemical Reviews, vol. 42, pp. 250–257, 1948.
Sidgwick: The Organic Chemistry of Nitrogen, p. 173, 1945.
Müller: Methoden der Organischen Chemie, Band VIII, Sauerstoffuerbindugen III, pp. 332–333.

CHARLES B. PARKER, *Primary Examiner.*

S. T. LAWRENCE III, *Assistant Examiner.*

U.S. Cl. X. R.

260—566, 599, 600, 999